Nov. 8, 1960    J. M. WEST    2,959,322
PRESSURE CLOSURE
Filed May 18, 1956

INVENTOR.
JOHN M. WEST
BY
ATTORNEY

# United States Patent Office 2,959,322
Patented Nov. 8, 1960

2,959,322

PRESSURE CLOSURE

John M. West, Pelham, N.Y., assignor to Foster Wheeler Corporation, New York, N.Y., a corporation of New York Filed May 18, 1956, Ser. No. 585,884

6 Claims. (Cl. 220—46)

This invention relates to closures for pressure vessels and more particularly to closures for high pressure heads of heat exchangers.

The present invention is an improvement over the pressure closure described in U.S. Patent No. 2,009,877, issued on July 30, 1935. This patent discloses a pressure closure comprising a sealing diaphragm which is "dish-shaped" to provide a flexible central portion and an integral enlarged sturdy rim portion. The sealing diaphragm is secured by a plurality of bolts disposed in peripheral spaced relationship to each other along the rim portion thereof and threaded into the gasket shoulder formed in the pressure vessel walls. A sealing gasket is disposed between the diaphragm and the gasket shoulder so that, when the bolts are tightened, a fluid tight seal is provided between the diaphragm and gasket shoulder. A relatively large pressure plate is constructed and arranged to butt against the surface of the entire central portion of the diaphragm and is held thereagainst by a plurality of shear pieces which are secured in a thrust shoulder formed in the vessel wall. The sealing diaphragm, under pressure exerted by the fluid in the vessel, bears against the pressure plate which, in turn, bears against the shear pieces. In this manner, a major portion of the pressure exerted by the fluid is transmitted to the pressure vessel wall to relieve the diaphragm bolts of a portion of the total hydrostatic pressure exerted by the fluid within the vessel.

The fabrication of the pressure closure, in accordance with the aforedescribed patent, has proven expensive and difficult because fabrication of the sealing diaphragm and rim member out of a single piece of material to provide a "dish-shaped" curvature in the diaphragm required difficult and extremely careful machining operations. In addition, since the pressure plate has to engage the diaphragm in continuous surface contact, the pressure plate had to be precisely machined. It is therefore necessary, in the fabrication of many of the pressure closures, to "hand-fit" the diaphragm and pressure plate to insure continuous surface contact therebetween, which operation also contributes to the high cost of the pressure closures.

Another disadvantage of the pressure closure disclosed in the aforedescribed U.S. patent is that an indeterminate portion of the hydrostatic pressure which acts against the central portion of the diaphragm is transmitted to the rim portion thereof by reason of the relative inflexibility of the diaphragm and the fact that the central portion of the diaphragm is integral with the rim portion. Since the portion of the hydrostatic pressure transmitted to the rim and, in turn, to the rim bolts, is indeterminate, the size and number of rim bolts cannot be accurately determined.

Accordingly, an object of the present invention is to provide an improved pressure closure of the type aforedescribed which is easily and inexpensively fabricated.

Another object is to provide a pressure closure wherein all, and not an indeterminate part, of the internal hydrostatic pressure is transmitted to the pressure vessel walls through the diaphragm and the pressure plate.

The present invention therefore contemplates a novel closure for a pressure vessel which comprises a thin and highly flexible diaphragm disposed adjacent a sealing or gasket surface of the pressure vessel and secured thereagainst by a rim member, the rim member being separate and apart from the diaphragm. A pressure plate is disposed to butt against the diaphragm and is restrained from movement in a direction away from the diaphragm by hold-down means which engage the walls of the vessel. The diaphragm is a substantially flat disc member which is machined to predetermined dimensions only on its surface adjacent to the sealing surface of the pressure vessel so that when the diaphragm is pressed between the sealing surface of the pressure vessel and the rim member a fluid-tight joint is effected to prevent leakage of fluid between the sealing surface and the diaphragm. The rim member and the pressure plate are constructed and arranged to engage each other so that the adjacent surfaces of the pressure plate and the diaphragm are positioned in proper abutting relationship.

The invention will be more fully understood from the following detailed description thereof when considered with the accompanying drawings in which.

Figure 1:
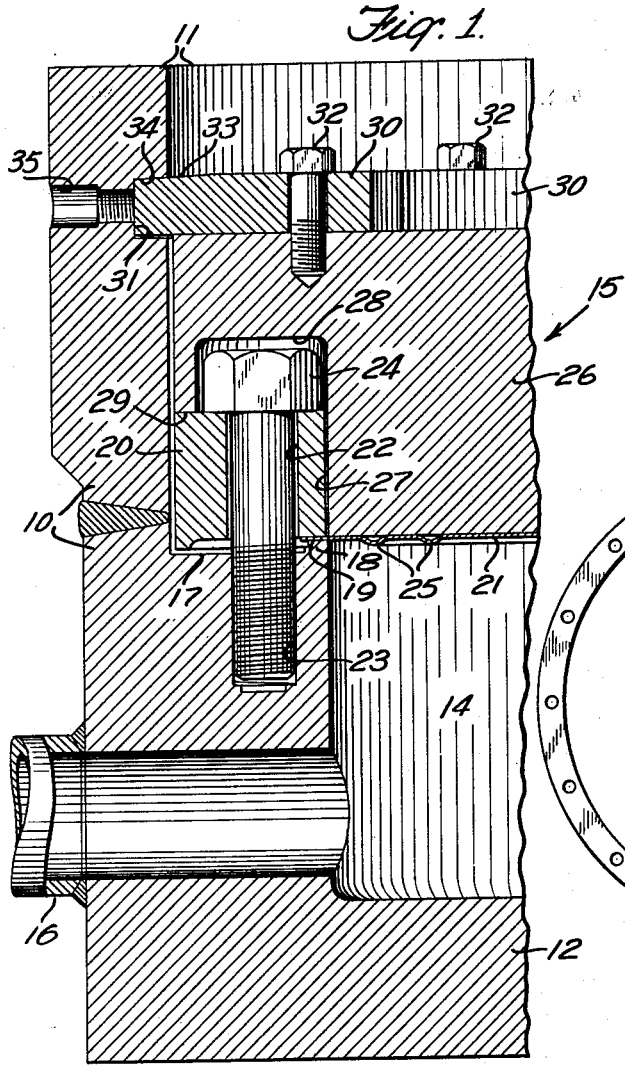
Fig. 1 is a fragmentary view, in cross-section, of a pressure closure according to the present invention.

Referring now to the drawings, and more specifically to Fig. 1, reference numeral 10 designates the cylindrical wall of a pressure vessel. In the drawings, for purposes of illustration, the pressure vessel is shown as the head of a heat exchanger of the shell and tube type which is well known to those skilled in the art, and therefore will not be described in detail. The heat exchanger head, as shown, comprises a cylindrical, hollow member which has an open end 11 and a wall or tube sheet 12, spaced inwardly from open end 11, which extends transversely of the axis (not shown) of the head. Heat exchanger tubes (not shown) are secured, in a fluid-tight manner, to tube sheet 12 so as to communicate with a pressure chamber 14 defined by tube sheet 12 and the pressure closure assembly 15 which constitutes the present invention and will be hereinafter fully described. Fluid under high pressure is either introduced or withdrawn from chamber 14, through connection 16, depending upon the direction of the flow of the fluid through the heat exchanger.

Figure 2:
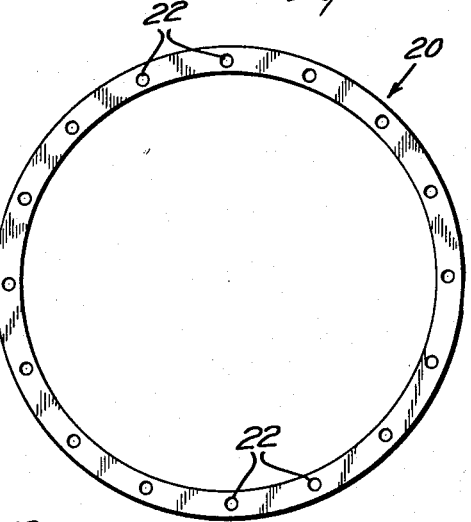
Fig. 2 is a plan view of the rim member (of Fig. 1 drawn on a smaller scale); and, Fig. 3 is a plan view of the diaphragm member employed in the pressure closure shown in Fig. 1 and is drawn on a smaller scale.
Figure 3:
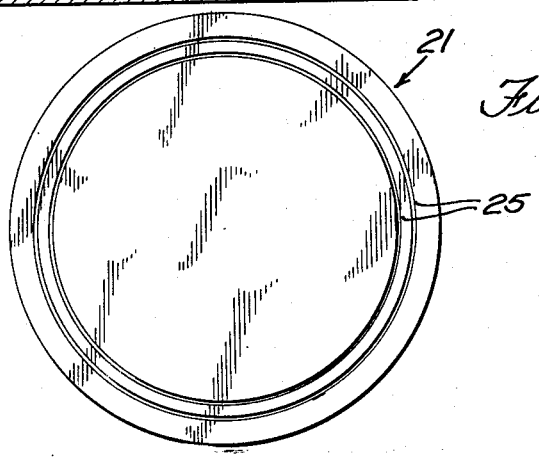

Wall 10 of the heat exchanger head is formed with an internal annular shoulder 17, hereinafter referred to as a gasket shoulder, disposed between open end 11 and tube sheet 12. Gasket shoulder 17 has a peripheral edge portion or tongue 18 which projects from the surface of the shoulder and the outer surface of which is machined to provide a smooth, flat sealing surface 19. A rim member or diaphragm ring 20, having a diameter and width substantially equal to the diameter and width of gasket shoulder 17, is disposed adjacent gasket shoulder 17. Interposed between gasket shoulder 17 and the diaphragm ring 20 is a highly flexible diaphragm member 21 which comprises a very thin flat circular sheet, as best shown in Fig. 3. Diaphragm 21 is simply and easily fabricated from a thin sheet of metal and only requires machining along the surface thereof which contacts sealing surface 19 of gasket shoulder 17. Diaphragm ring 20 is provided with a plurality of peripherally spaced holes 22 (Fig. 2) which register with threaded bores 23 (Fig. 1)

in gasket shoulder 17. A plurality of stud bolts 24 (only one of which is shown in Fig. 1) are inserted in holes 22 and are threaded into bores 23 to urge diaphragm ring 20 toward gasket shoulder 17 and squeeze diaphragm 21, as shown, between gasket shoulder 17 and diaphragm ring 20. The pressure exerted by stud bolts 24 against diaphragm ring 20, forces the machined surface of the diaphragm 21 against sealing surface 19 whereby a fluid tight joint is provided to prevent fluid leaking from chamber 14 between diaphragm 21 and gasket shoulder 17. Diaphragm 21 may be provided with one or more concentric corrugations 25, as best shown in Fig. 3, which allow for the differential thermal expansion of the heat exchanger head and diaphragm 21.

A pressure plate 26, which comprises a relatively thick cylindrical disc-shaped member having plane, parallel inner and outer ends and a peripheral cut-out 27 in the inner end thereof to accommodate diaphragm ring 20, is positioned, as shown, abutting against the surface of diaphragm 21. A plurality of recesses 28 are provided in the peripheral cut-out 27 to receive the heads of stud bolts 24 and to provide a plurality of bearing surfaces or shoulders 29, lying in the same plane (only one being shown in Fig. 1), which bear or seat against the outer surface of diaphragm ring 20. Bearing surfaces or shoulders 29 of pressure plate 26 and the surface of diaphragm ring 20, which engage shoulders 29, are accurately machined to predetermined dimensions to insure proper positioning of pressure plate 26 in continuous surface contact with diaphragm 21. A groove may be provided in cut-out portion 27 in place of recesses 28 which groove would form a peripheral annular shoulder for bearing against the surface of diaphragm ring 20.

A plurality of segmental shear blocks 30 are slidably inserted into an annular recess or thrust groove 31, which is formed in wall 10 adjacent the outer end of pressure plate 26. Shear blocks 30 engage pressure plate 26 and are secured thereto by bolts 32, as shown, the shear blocks maintaining pressure plates 26 against diaphragm ring 20, at 29. The outward thrust (upward thrust as viewed in Fig. 1) exerted by pressure plate 26 against shear blocks 30 is transmitted to wall 10 of the vessel through the shear blocks and groove 31. The surface of each shear block 30 is tapered, as shown at 33, which tapered surfaces correspond to the tapered wall 34 of thrust groove 31. A plurality of threaded holes 35 (only one of which is shown in Fig. 1), are provided in spaced relationship to one another around the periphery of wall 10 and in communication with thrust groove 31. Threaded holes 35 are adapted to receive "jack" bolts (not shown) when it is desired to disassemble the pressure closure. As can be readily seen, disassembly of the unit is greatly simplified, when the unit is hot and shear blocks 31 are compressed against tapered surface 34 of thrust groove 31, by first removing bolts 32 and threading "jack" bolts into holes 35 to force shear blocks 30 from thrust groove 31.

In the pressure closure assembly 15, aforedescribed, hydrostatic pressure of the fluid in chamber 14 acts against substantially the entire area of diaphragm 21 and, since the diaphragm is highly flexible and is a member separate from diaphragm ring 20, none of the pressure is transmitted to stud bolts 24. Furthermore, because pressure plate 26 bears against the entire area of diaphragm 21 which is subjected to the fluid pressure, the entire hydrostatic pressure is transmitted through diaphragm 21 to pressure plate 26 and, in turn, to wall 10 through shear blocks 30 and thrust groove 31. The size and number of stud bolts 24 is readily determined by calculating only the force necessary to provide sufficient pressure upon diaphragm 21 to effect a fluid tight seal between the latter and gasket shoulder 17 under a predetermined maximum hydrostatic pressure.

From the foregoing, it will be perceived that an improved pressure closure assembly has been provided wherein the component parts can be readily and easily fabricated by use of conventional automatic cutting machines, as for example, lathe or boring mills. In addition, a pressure closure is provided wherein all of the hydrostatic pressure is transmitted to the walls of the pressure vessel, and none to the means for providing a fluid tight seal.

Although, the invention has been disclosed as applied to a heat exchanger of the shell and tube type, it is to be expressly understood that the invention is not limited thereto, the invention being applicable to many types of high pressure vessels. In addition, it is to be understood that various changes can be made in the arrangement of parts without departing from the spirit and scope of the invention, as the same will now be understood by those skilled in the art.

I claim:

1. In a hollow body member adapted to hold fluid under pressure and having an opening and an annular sealing surface formed inwardly of said opening, a flexible diaphragm disposed within said hollow body member with the peripheral portion thereof engaging said annular sealing surface, an annular ring member disposed within said hollow body member in engagement with the peripheral portion of said diaphragm, means for urging said ring member against said diaphragm to press said peripheral portion against said annular sealing surface in a fluid-tight manner, a pressure plate dimensioned to fit within said hollow body member and having a reduced body portion, said pressure plate being disposed within the hollow body member with the reduced body portion thereof within said ring member and in abutment against the diaphragm for supporting the latter against all of the fluid pressure exerted thereagainst, and means for engaging said pressure plate and said hollow body member for restraining movement of the pressure plate in a direction away from said diaphragm and to transmit pressure exerted by said fluid to said body member.

2. In a hollow body member adapted to receive fluid under pressure and having an opening and an annular sealing surface formed inwardly of said opening, a flexible diaphragm having a peripheral portion and an integral central portion, said diaphragm being disposed in the body member with the peripheral portion thereof engaging the annular sealing surface, an annular ring member disposed within said hollow body member in engagement with the peripheral portion of said diaphragm, means for urging said ring member against said diaphragm to press said peripheral portion against said annular sealing surface in a fluid-tight manner, a pressure plate dimensioned to fit within said hollow body member and having a reduced body portion and an annular shoulder, said pressure plate being disposed with said reduced body portion within the ring member and the shoulder thereof in abutment against the ring member to position the reduced body portion in abutment against the central portion of said diaphragm for supporting the latter against all of the fluid pressure exerted thereagainst, and means for engaging said pressure plate and said hollow body member for restraining movement of the pressure plate in a direction away from said diaphragm and to transmit pressure exerted by said fluid to said body member.

3. In a hollow body member adapted to hold fluid under pressure and having at least one open end, an annular recess in said body member spaced inwardly of said opening, an annular gasket shoulder in said body member spaced inwardly of said annular recess, an annular ring member of substantially the same circumference as said annular gasket shoulder, a diaphragm having a peripheral portion and an integral central portion, said diaphragm being disposed with the peripheral portion between said annular ring member and said gasket shoulder, means for urging said ring member toward said gasket shoulder to press said peripheral portion of said diaphragm against said gasket shoulder to prevent leakage of fluid therebetween, a pressure plate having a peripheral cut-out portion to provide a reduced body portion and an annular shoulder, said reduced body portion being adapted to fit within the inner periphery of said annular ring member, said pressure plate disposed within said body member with the reduced body portion thereof disposed within the inner periphery of said annular ring member and said annular shoulder abutting said ring member to position the reduced body portion of the pressure plate in abutting relationship with the central portion of said diaphragm, and means receivable in said annular recess and in abutment with said pressure plate to restrain movement of said pressure plate in a direction away from said diaphragm.

4. Apparatus of the class described, comprising a hollow body member having at least one open end and adapted for receiving fluid under a relatively high pressure, said body member having an annular thrust groove adjacent said open end of the body member and an annular gasket shoulder spaced inwardly from said thrust groove, an annular ring member having a circumference and width substantially equal to the width and circumference of said gasket shoulder and disposed adjacent the latter, a flexible diaphragm member having a peripheral portion and an integral central portion, said diaphragm member being disposed with the peripheral portion thereof between the gasket shoulder and said ring member for sealing said open end of said body member and to receive pressure of said fluid, means for urging said ring member toward said gasket shoulder to press the peripheral portion of said diaphragm against said gasket shoulder to provide a fluid-tight joint, a pressure plate disposed within said hollow body member and positioned between said thrust groove and said gasket shoulder, said pressure plate having a peripheral cut-out portion of substantially the same size as said gasket shoulder to provide a reduced body portion adapted to fit within the inner periphery of said annular ring member and an annular shoulder adapted to abut said ring member whereby said reduced body portion is positioned in abutment against the central portion of said diaphragm member, and shear means for engaging said thrust groove and said pressure plate to restrain movement of the latter in a direction away from the gasket shoulder and for receiving pressure of said fluid transmitted through said diaphragm and the pressure plate.

5. Apparatus of the class described, comprising a hollow body member having an open end and adapted for sustaining fluid under pressure, said body member having an annular thrust groove in the inner surface thereof adjacent the open end of the body member and an annular gasket shoulder on the inner surface of said body member spaced inwardly from said thrust groove, said annular gasket shoulder having a sealing surface thereon, a ring member having a width and circumference substantially equal to the width and circumference of said gasket shoulder and disposed adjacent the latter, a thin flexible metal diaphragm having a peripheral sealing portion and an integral body portion being disposed with the peripheral sealing portion thereof between said annular gasket shoulder sealing surface and said ring member, said body portion being subjected to pressure exerted by said fluid, a plurality of spaced bolts extending through said ring member and threaded into the gasket shoulder for urging said ring member toward said gasket shoulder to press said peripheral sealing portion of said diaphragm against the sealing surface of said gasket shoulder to provide a fluid-tight joint therebetween, a pressure plate having an annular peripheral cut-out portion of substantially the same size as said gasket shoulder to provide a reduced body portion receivable within said ring member and an annular shoulder adapted to engage said ring member to restrain movement of said pressure plate in a direction toward said gasket shoulder and to position said pressure plate in abutment against the inner body portion of said diaphragm to support the latter against the pressure exerted by the fluid on said diaphragm, a plurality of shear pieces receivable in said thrust groove and in abutment against said pressure plate to restrain movement of the latter in a direction away from the gasket shoulder and for receiving pressure of said fluid transmitted through said diaphragm and said pressure plate.

6. Pressure vessel means and a removable closure therefor, said pressure vessel having an outwardly opening end portion and a coaxial internal annular ledge spaced inwardly of the outer end thereof, a cover member having releasable interfitting connection with said pressure vessel at its open end, a diaphragm having a free flexible annular marginal portion seating on said ledge and a compression ring seating against the outer surface of said annular marginal portion, and a screw means acting on said compression ring to clamp said outer marginal diaphragm portion against said ledge in sealing relation therewith, the portion of said diaphragm radially inwardly of said annular marginal portion being in surface abutment with said cover member at the inner face of the latter whereby outward fluid pressure against said diaphragm portion is transferred directly to said outer cover member.

References Cited in the file of this patent

UNITED STATES PATENTS

| | | |
|---|---|---|
| 2,009,877 | Dodd | July 30, 1935 |
| 2,219,659 | Price | Oct. 29, 1940 |
| 2,690,275 | Alt et al. | Sept. 28, 1954 |
| 2,766,903 | Boni | Oct. 16, 1956 |
| 2,863,648 | Tinker | Dec. 9, 1958 |